(12) United States Patent
Leveau-Mollier

(10) Patent No.: US 7,116,811 B2
(45) Date of Patent: Oct. 3, 2006

(54) METHOD AND APPARATUS FOR QUALIFICATION OF IMAGE DETECTORS

(75) Inventor: Severine Leveau-Mollier, Le Plessis-Robinson (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 722 days.

(21) Appl. No.: 10/000,156

(22) Filed: Oct. 30, 2001

(65) Prior Publication Data

US 2002/0149684 A1    Oct. 17, 2002

(30) Foreign Application Priority Data

Oct. 31, 2000    (FR)    .................................. 00 13970

(51) Int. Cl.
    *G06K 9/00*    (2006.01)
(52) U.S. Cl. ...................................... 382/132; 348/246
(58) Field of Classification Search ................ 382/128, 382/141–149, 172, 192; 348/246, 247
    See application file for complete search history.

(56) References Cited

U.S. PATENT DOCUMENTS

| | | | | |
|---|---|---|---|---|
| 5,339,092 A | * | 8/1994 | Johnson et al. | 345/611 |
| 5,361,307 A | | 11/1994 | Hartley et al. | 382/1 |
| 5,657,400 A | * | 8/1997 | Granfors et al. | 382/254 |
| 5,847,823 A | * | 12/1998 | Imaino et al. | 356/243.1 |
| 5,854,655 A | * | 12/1998 | Watanabe et al. | 348/247 |
| 6,219,443 B1 | * | 4/2001 | Lawrence | 382/141 |
| 6,293,465 B1 | * | 9/2001 | Heller et al. | 235/454 |
| 6,381,357 B1 | * | 4/2002 | Tan et al. | 382/141 |
| 6,593,961 B1 | * | 7/2003 | Perino | 348/187 |
| 6,795,118 B1 | * | 9/2004 | Cho | 348/246 |
| 6,819,358 B1 | * | 11/2004 | Kagle et al. | 348/246 |

FOREIGN PATENT DOCUMENTS

| EP | 0859509 | 8/1998 |
|---|---|---|
| EP | 0997845 | 5/2000 |

\* cited by examiner

*Primary Examiner*—Jingge Wu
*Assistant Examiner*—Tom Y. Lu
(74) *Attorney, Agent, or Firm*—Cantor Colburn LLP

(57) ABSTRACT

A method and apparatus of qualification of an image sensor of the type supplying images in the form of pixels by determining the maximum limit of the number of bad pixels in a given area of the image that can be processed by means for processing the bad pixels; defining a window having the format of the given area; establishing a cartography of the pixels forming an image delivered by the sensor, which indicates the locations of the bad pixels; checking whether a part of the cartography that may contain the window has a set of bad pixels incompatible with the maximum limit; and qualifying or rejecting the sensor depending on the control result.

75 Claims, 11 Drawing Sheets

METHOD AND APPARATUS FOR QUALIFICATION OF IMAGE DETECTORS

CROSS REFERENCE TO RELATED APPLICATIONS

This application claims the benefit of a priority under 35 USC 119 to French Patent Application No. 0013970 filed Oct. 31, 2000, the entire contents of which are incorporated by reference.

BACKGROUND OF THE INVENTION

The present invention concerns the qualification of an electrooptical image sensor, the possible image defects of which may be masked by electronic processing in an image chain. The qualification is to determine whether the number and/or distribution of image defects of the sensor allows such masking or not without disturbing the proper operation of the image chain. The sensor can have a surface or a line of sensitive elements on which an image (optical, radiological or other) is presented or which in response produces signals in the form of pixels to reproduce that image, for example, on a monitor screen.

In the sensor it is almost impossible to obtain a correct operation of all the sensitive elements. In fact, the presence of defective elements is generally discovered after manufacture of the sensor, as is the appearance of new defective elements in the course of use. An element is considered defective if it produces a signal which does not vary, or not in the manner desired, depending on the exposure received. For example, a defective element may not produce any signal, or a constant signal regardless of the degree of exposure received. A defective element gives rise to what is called a bad pixel.

A bad pixel constitutes a loss of image information on the site of the corresponding defective element. If the image obtained by a sensor is visualized without masking the bad pixels present, the latter appear as so many black or white spots.

To avoid such a visual inconvenience, so-called interpolation techniques have been employed, aimed at masking the bad pixels on the image visualized. The masking is carried out by a digital processing of the bad pixels in an image processing system. The technique generally used is to substitute the erroneous digital value of the bad pixel with a value which is estimated from one or more correct neighboring pixels. For example, a value which is the mean value of the neighboring pixels situated to the right, to the left, directly above and directly below can be assigned to the defective pixel.

A bad pixel thus processed thereby renders a luminous intensity which does not clash with that of its neighbors, removing the visual inconvenience. The operation consisting of assigning an interpolated value to a bad pixel is generally designated by the term "bad pixel correction," although it does not strictly involve restoring the functioning of the defective element.

To be able to correct bad pixels that way, it is first necessary to know their position in the image. For this purpose, a calibration stage is undertaken in which the sensor is subjected to known uniform exposures, and where the picked-up signal of each element is measured in order to locate those which produced an unacceptable signal. Following that procedure, a cartography of the bad pixels of the sensor in question is obtained, which indicates their position according to a system of coordinates, for example, in terms of line and column number, and the good pixels to be counted for interpolation.

This cartography is registered in the image processing system so that the latter can, on the one hand, identify each bad pixel on image output and, on the other, make the correction with the neighboring good pixels. That processing involves, for each bad pixel, establishing a code which fixes the method of calculation. The kind of code used depends, among other things, on the type of sensor, its dimensions and the interpolation algorithm.

The calculation time necessary for processing of bad pixels is not negligible compared to the time allowed for reading and other image processing. For a given system of correction of bad pixels, that processing time is not a simple function of the total number of bad pixels, for it also depends on their distribution on the sensitive surface.

Of course, in applications where only static images are processed, for example, in mammography, or of images which follow each other only at low frequency, an additional delay can be admitted in appearance of the image on the monitor due to the processing of bad pixels.

On the other hand, that delay must be strictly limited when dynamic images are produced, for example, in angiography, where typically 30 images (or frames) per second come out. In that case, the time which can be allotted to the correction of bad pixels or to other processing cannot exceed the period between two successive frames, at the risk of accumulating delays in the sequence of frames supplied on output and of disturbing operation of the image chain.

Hence, it is useful to be able to determine in advance whether a sensor is not going to require a time for correction of the bad pixels too long to permit its use with a given image processing system.

BRIEF DESCRIPTION OF THE INVENTION

An embodiment of the invention is directed to an automated method of qualification of an image sensor of the type supplying images in the form of pixels, the qualification being established as a function of the possible bad pixels on output of the sensor and specific means employed for processing of those bad pixels. The method comprises the steps of:

determining the maximum limit of bad pixels in a given area of the image that can be processed by means of processing of the bad pixels, in case of an unfavorable distribution of the latter in terms of processing time needed;

defining a window having the format of the area determined;

establishing a cartography of the pixels forming an image delivered by the sensor, which indicates the locations of the bad pixels;

checking whether a part of the cartography that may contain the window has a set of bad pixels incompatible with the maximum limit; and qualifying or rejecting the sensor depending on the control result.

The control stage comprises preferably of moving the window line by line over the entire cartography and, for each position of the window and making a calculation from the number of bad pixels present in the window.

When the processing of bad pixels is intended to be carried out in parallel, each line of pixels on output of the sensor being divided into a number s of sections, the pixels of each section being assigned to a respective parallel processing path, the set of bad pixels counted in a window on the control stage consists, for each line of the window, solely of bad pixels to be found in the latter among the s line sections where they are most numerous.

The set of bad pixels counted can thus comprise the sum of the most numerous pixels in a line section on each of the lines of the window, which sum should not exceed the maximum limit.

In the embodiment of the invention the number of line sections is equal to four, the bad pixels being processed in parallel on four paths in the means of correction of the bad pixels.

In a variant embodiment of the invention, the set of bad pixels counted on the control stage can comprise the sum of the bad pixels in the window.

A detector is preferably rejected if there should be only one location of the window on its cartography for which the set of bad pixels is incompatible with the maximum limit.

The maximum limit is preferably calculated on the basis of the number of bad pixels in a batch of bad lines comprising a given number of successive lines, each containing a number of bad pixels likely to create a maximum processing time for that line on the means of processing bad pixels or on one of the parallel processing paths of those means.

The number of bad lines determined is also preferably the limiting number of lines beyond which the time of processing the bad pixels for the entire batch of bad lines would occasion an inadmissible delay in output of the image after processing.

The batch of bad lines advantageously comprises the last lines to be processed by the means of processing the bad pixels.

The size of the given area and therefore of the window can be calculated on the basis of a maximum frequency of appearance of a batch of bad lines in a hypothetical cartography, beyond which the time of processing of the bad pixels for the set would occasion an inadmissible delay in output of the image after processing.

The size of the window can then depend on the number of bad lines in a batch of bad lines and on the number of lines separating two successive batches of bad lines in the hypothetical cartography.

The size of the window, expressed in lines of pixels, can be equal at least to the number of bad lines of the batch of bad lines plus the number of lines separating two successive batches of bad lines in the hypothetical cartography.

The calculation of the maximum limit of number of bad pixels in a given area of the image that can be processed may include a first phase of establishment of a real limiting value and a second stage of obtaining a limiting value used for the control, the latter value being obtained by reducing the real limiting value. In that way, an extra margin is created.

Calculation of the size of the window likewise includes a first phase of establishment of a size determined on the basis of a real limiting value in terms of number of lines and a second phase of obtaining a size value used for control, the latter value being obtained by increasing the real limiting value.

In an embodiment of the invention, qualification is provided for a case of use of a detector delivering images in dynamic mode, the separation between two successive images being fixed, where the processing time needed on the stage of determination of the maximum limit of number of bad pixels is determined on the basis of time remaining between the end of an image on output after processing of the bad pixels and arrival of the following image.

In a parameterization of the invention where the frequency of dynamic images is 30 images per second, the maximum limit in number of bad pixels is determined so that the time remaining is greater than or equal to 690 microseconds.

The procedure can be employed for the qualification of sensors intended for medical radiology.

An embodiment of the invention is directed to an apparatus for qualification of an image sensor of the type supplying images in the form of pixels, the qualification being established as a function of the possible bad pixels on output of the sensor and of specific means employed for the processing of those bad pixels. The apparatus comprises:

means for loading a cartography of pixels forming an image delivered by the sensor, which indicates the locations of the bad pixels;

means for loading qualification calculation parameters, with the maximum limit in number of bad pixels in a given area of the image that can be processed by means for processing of the bad pixels, in case of an unfavorable distribution of the latter in terms of processing time required; and means for providing a window having the format of the given area;

means for calculation applying the calculation parameters on the cartography in order to determine whether a part of the cartography that may contain the window has a set of bad pixels incompatible with the maximum limit, and means for qualifying or rejecting the sensor depending on the control.

The optional aspects of the embodiments of the invention described above with reference to the method are applicable, with the necessary changes, to this apparatus.

BRIEF DESCRIPTION OF THE DRAWINGS

The invention will be better understood and the advantages resulting therefrom will be more clearly apparent on reading preferred embodiments, given strictly by way of nonlimitative example, with reference to the attached figures in which.

DETAILED DESCRIPTION OF THE INVENTION

Figure 1:
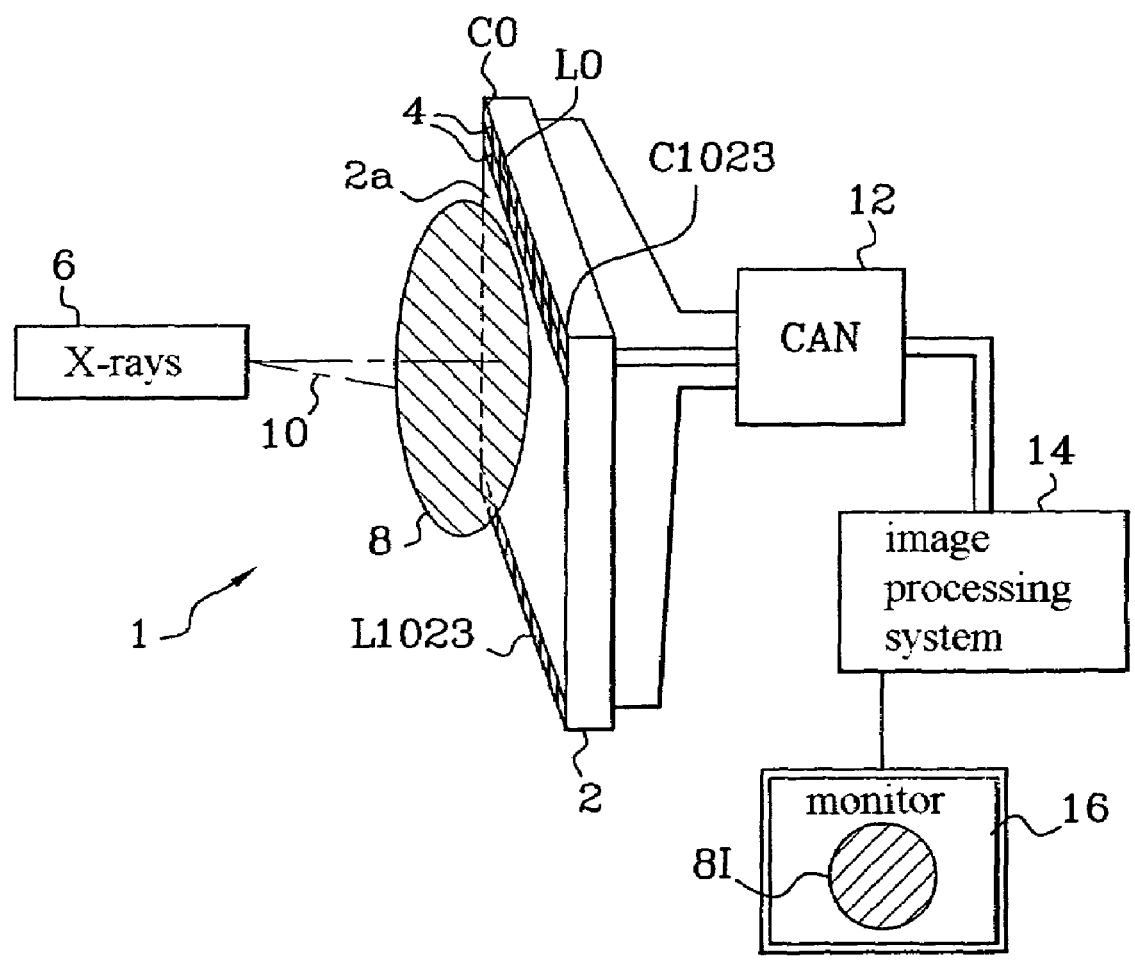
FIG. 1 shows the main elements used in a medical image chain based on an image sensor delivering pixels.

FIG. 1 illustrates the basic elements a sensor 1 which may be used in a digital radiological image. The sensor 2, in this example, has a two-dimensional sensitive surface 2a comprising a mosaic of sensitive elements 4 (only some of which are represented in the figure) constituting an image plane, like a standard X-ray film. The sensor 2 is placed in front of an X-ray source 6 with an object 8, e.g., a patient) symbolically represented by an ellipse supported against the photosensitive surface 2a. The sensitive elements 4 receive a part of the more or less attenuated X-ray flux through the internal structure of the object 8. In response, each sensitive element 4 produces an electronic signal which expresses the radiation dose received during a period of exposure. The signal is picked up for each of the sensitive elements 4 in order to reconstitute in electronic form the distribution of flux intensities transmitted through the object 8, which corresponds in electronic form to a radiological image.

The signal produced by a sensitive element 4 will be designated by the term "pixel." In the example, the sensitive surface 2a is composed of 1024 lines L0 to L1023, each containing 1024 sensitive elements 4 on respective columns C0 to C1023, making it possible to produce an image of 1024×1024 pixels.

The raw signal of each sensitive element 4 is in analog form, involving a current or a voltage which takes a value in a continuous range depending on the radiation dose received at its location during the time of exposure of the image. The signal is picked up by reading circuits (not represented) at each corner of the sensor 4, a circuit ensuring the reading of a respective quarter of the image. It is then converted into a digital signal by an analog-digital converter 12. That conversion makes it possible to express the value of the analog signal of a pixel by a corresponding binary word out of a predetermined number of bits, fourteen, for example. Each pixel is then processed like a binary word, the value of which is all the higher as the exposure received is greater, or vice versa according to the technology of sensor 2.

These digitized pixels are stored and processed by an image processing system 14, in order to offer various possibilities of improvement of image, formatting, comparison, image presentation, archiving, etc. One of the outputs of the image processing system 14 represented supplies fixed or dynamic video signals to a monitor 16, enabling the latter to display the image 81 of the patient 8.

Figure 2:
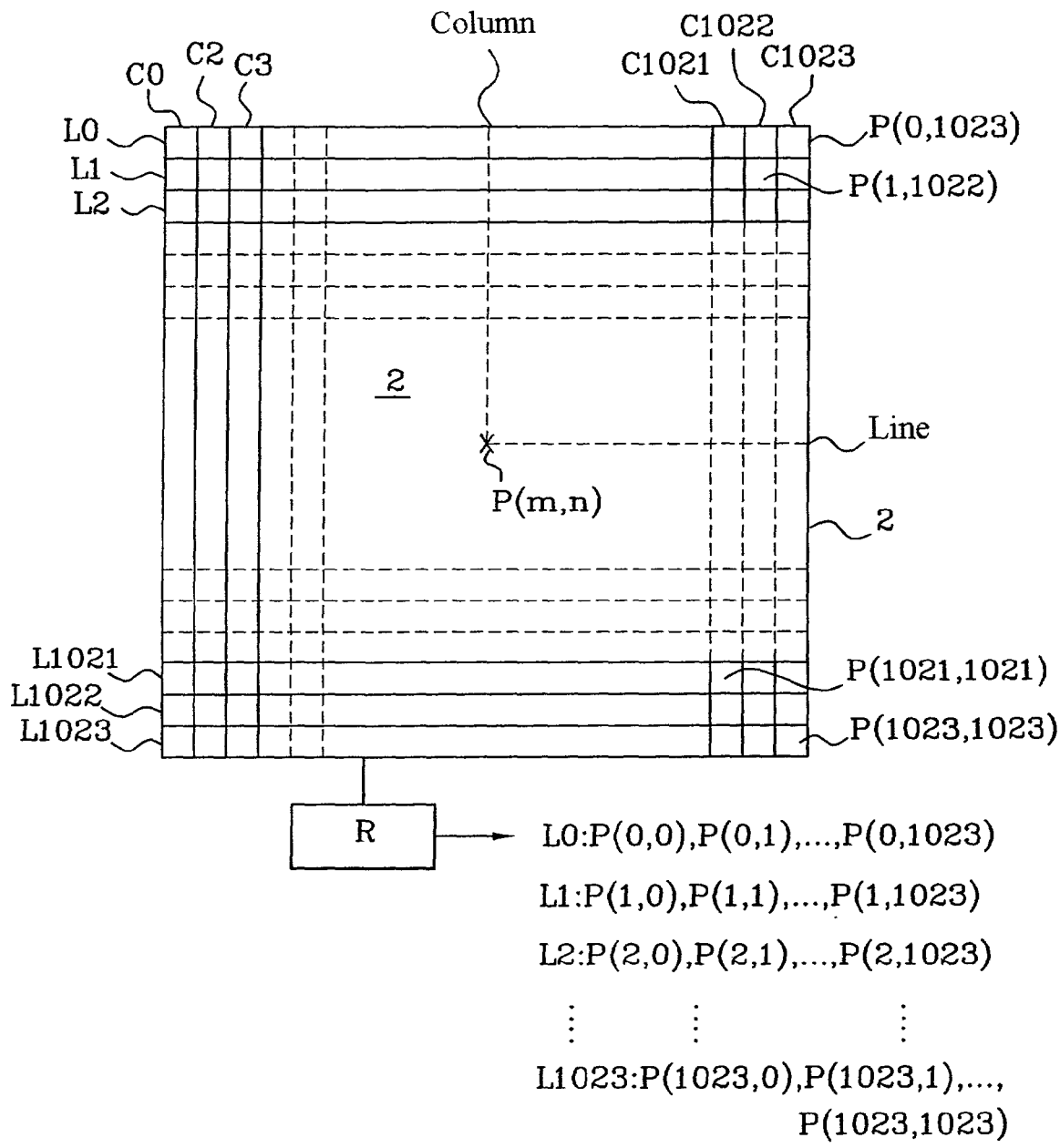
FIG. 2 is a topographic representation of pixels corresponding to the sensitive elements of a sensor having a single pixel reading circuit.

FIG. 2 is a topographic representation of pixels corresponding to the sensitive elements 4 of a sensor 2. The sensitive surface 2a (FIG. 1) produces a matrix of pixels composed of 1024 lines and 1024 columns. Those pixels are referenced in relation to a grid of coordinates which establishes for a given pixel its position in terms of its line Lm and of its column Cn, where m and n are integers from 0 to 1023. In the convention used, a pixel at line Lm and at column Cn is designated P(m,n).

For reasons of simplification, it will be assumed in the example that reading of the pixels is carried out by a single reading circuit R. For each image of 1024×1024 pixels, circuit R delivers the pixels in line by line series, starting with pixel P(0,0) of the first column C0 of the first line L0, followed by pixel P(0,1) of the second column C1 of that line, etc. The last pixel P(0,1023) of the first line is immediately followed by the first pixel of the second line P(1,0), etc., up to pixel P(1023,1023) of the last column of the last line.

Figure 3:
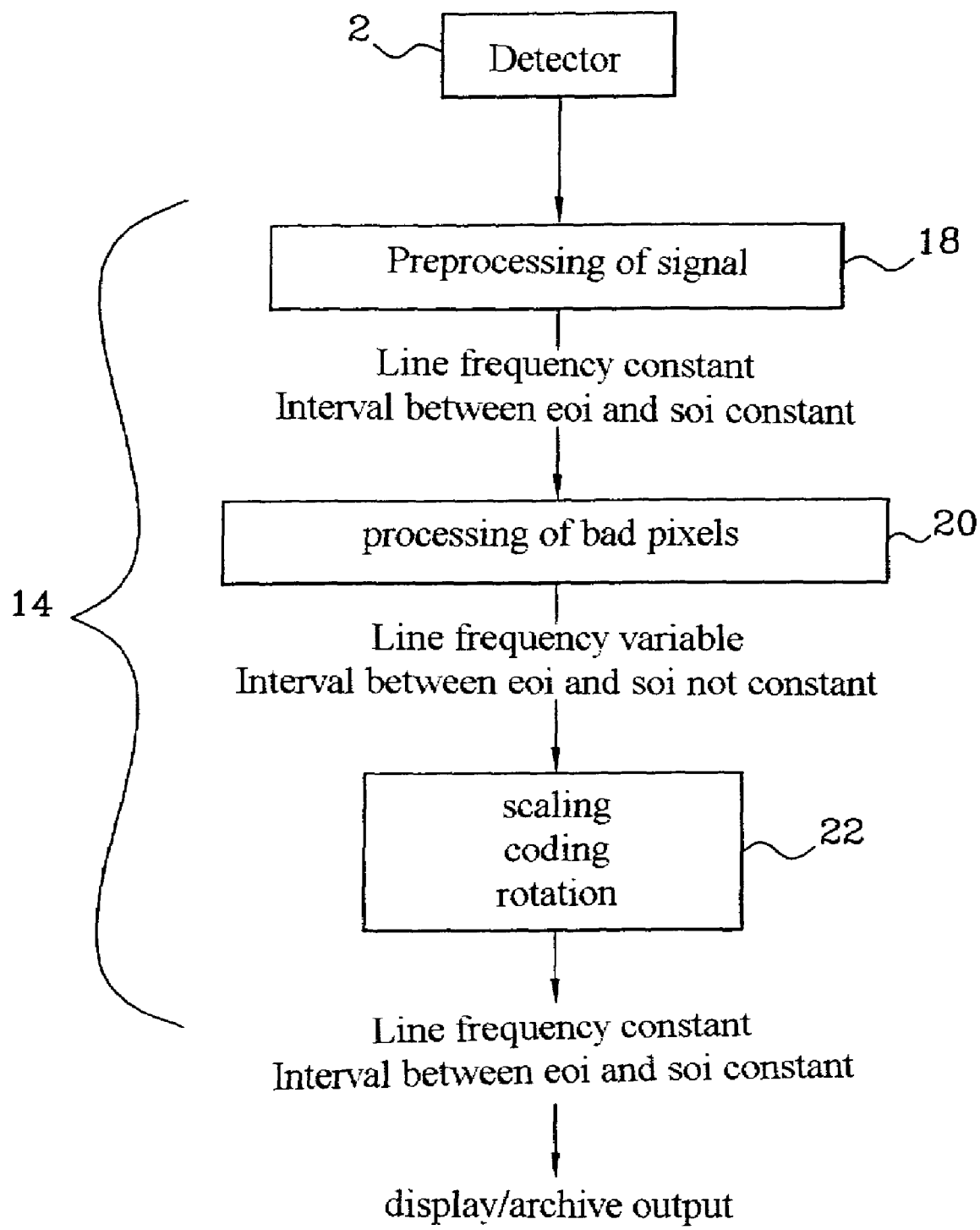
FIG. 3 is a simplified diagram of the main functional blocks used in an image chain receiving on input pixels coming from an image sensor.

FIG. 3 is a simplified block diagram of the system of processing image 14 of FIG. 1. That system is broken down into three functional blocks which successively process the pixels of the sensor. A first pretreatment block 18 which receives the pixels coming from the sensor 2 on output of the converter 12 and the role of which is to adjust the level as a function of the characteristics of the sensor (mean shift, shift subtraction, pixel gain coefficient, saturation, etc.). A second block 20 which corrects the bad pixels by interpolation, that is, by calculating for each bad pixel a mean value established on the neighboring good pixels (to the left, to the right, directly above and directly blow). Depending on the position of the bad pixel to be corrected (on the edge or inside the image) and the number of good pixels available among the neighbors, the number of pixel counted for the interpolation is variable from 1 to 4 (1, 2 or 4). A third block 22 on output of processing of the bad pixels, which ensures functions of image processing according to the functions required (scaling, coding, rotation, etc.). In order to multiply the rate of image processing, this set of three functional blocks uses parallel processors.

In the second block 20 for processing of the bad pixels, four parallel processing paths are provided, each path being assigned to the correction of bad pixels on a respective quarter-line. Each path contains its own processor, the set being controlled by a master processor. Thus, a first path will process only the bad pixels situated at columns 0 to 255, a second path processing in parallel the bad pixels situated at columns 256 to 511, etc. The quarter-lines assigned to the respective paths are designated by the term "quadrant."

The following consequences of this type of parallel processing of bad pixels can then be noted:

the time for processing the bad pixels of a line is equal to the longest time of processing among the four paths, the time for processing a line containing 256 bad pixels, all grouped in a same quadrant, is the same as that for processing an entire line of 1024 bad pixels, and for a given number of bad pixels on a line, the processing time will be maximal, if those pixels are all situated in a same quadrant, and minimal if they are uniformly distributed among the four line quadrants.

Figure 4A:
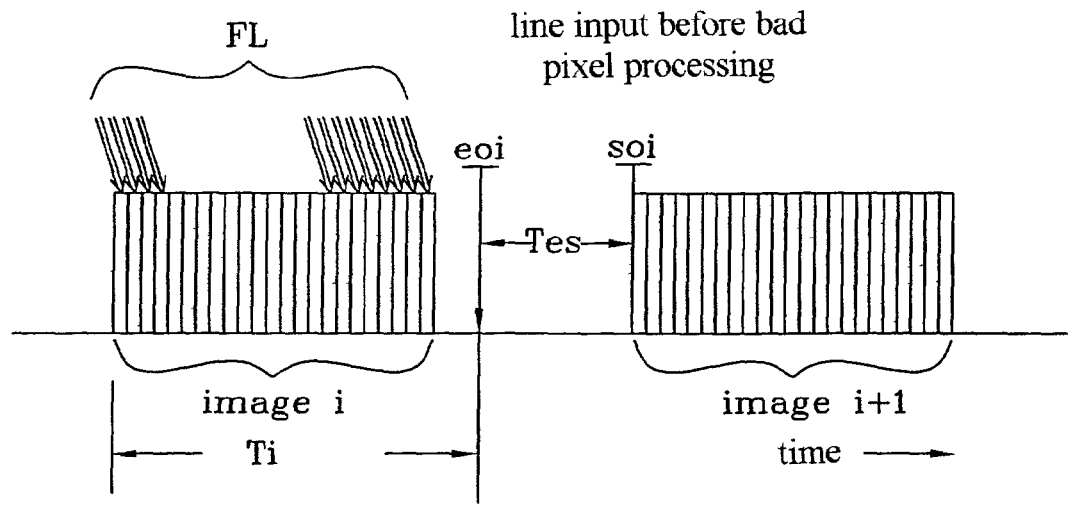
FIGS. 4a, 4b and 4c are general diagrams showing the time shifts occasioned by processing of the bad pixels in the chain of FIG. 3.
Figure 4B:
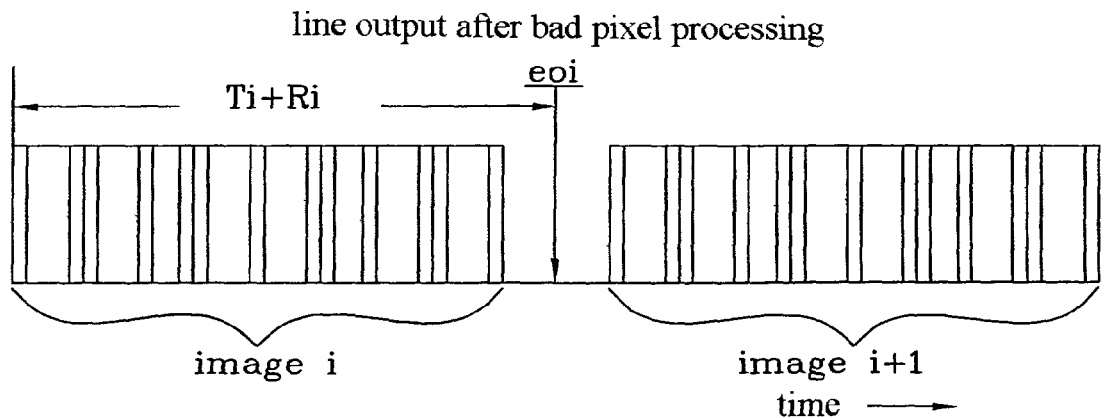
Figure 4C:
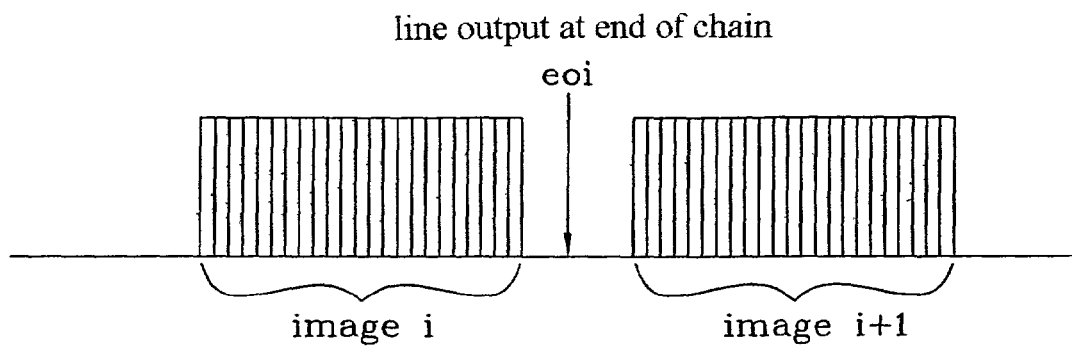

The sequence of transmission of the pixels to those three functional blocks will now be described with reference to FIGS. 4a, 4b and 4c. It begins with output of the pixels from the first block 18 and, therefore, after preprocessing. Preprocessing does not alter the continuity of the transfer flow of successive lines from the detector, the latter therefore arriving at a regular rate in the second block 20. As FIG. 4a shows, the lines of pixels of an image i are delivered without interruption to the second block 20 processing the bad pixels (arrows FL) at a rate fixed by an internal clock of the image processing system 14. The successive images i and i+1 on input from that block 20 follow each other at a uniform interval Tes, determined by the number of images taken per second.

More specifically, that time Tes corresponds to the interval between a signal eoi emitted by the first block 18 signaling the end of the flow of pixels for the last line of an image i and the instant soi of arrival of the flow of pixels for the first line of the following image i+1. Signal eoi appears a short time after the last line of an image i. Upon reception of the first lines of an image, the second block 20 starts carrying out processing of the bad pixels. An interpolation of values from good pixels contiguous to a bad pixel being involved, a correction of a bad pixel on a given line L can be made immediately after loading of the following line L+1 by the first block 18.

The second block 20 delivers the corrected image of the bad pixels line by line to the third block 22 downstream. A line is thus transferred to the third block as soon as the possible bad pixels located there have been corrected. Due to the fact that the time of processing bad pixels depends on the number and distribution of bad pixels on a line, the frequency of output of lines to the third block 22 is variable, as shown in FIG. 4b. It is noted that processing of the bad pixels generates two types of delays in transfer of an image to the third block: an overall delay Ri which corresponds to the extra time that transfer of the image i takes from the second block over the time of transfer Ti of that image from the first block 18, and a local delay corresponding to the wait from one line L to the next L+1. Those delays impose two types of restraint on the third block 22. On the one hand, the overall delay must be absorbed so that the third block can continue maintaining on output the rate of transfer of successive images (for example, 30 per second) and, on the other, the local delay must not be such that the third block will try to read a line which is not yet ready. To accommodate those restraints, the third block 22 includes a line buffer memory on input, which makes it possible to start reading lines of pixels some time after they have been transmitted by the second block 20. However, the third block 22 must at all times ensure a flow of images with a constant line frequency and a constant interval Tes between the successive lines. That prerogative implies, therefore, a limit on delays occasioned by the processing of bad pixels by the second block 20. In fact, the presence of the buffer memory in the third block can only absorb local delays, within a limit set by the storage capacity of that memory. In particular, the local delays due to the last lines to be loaded in the third block are generally the most critical, since the time remaining to absorb those delays is less by reason of the imminent arrival of the following image. In view of the foregoing, it is considered that, in the case of a sensor 2 containing a given number of pixels, the worst case in terms of possibility of processing is when those bad pixels are, on the one hand, grouped in the same quadrant and, on the other, when they are concentrated in the last lines to be read.

The method of qualification of sensors according to an embodiment of the invention takes into account those two types of contribution in the evaluation of a worst case of processing of bad pixels for a given number of bad pixels. That qualification embraces several phases which will be described as follows.

First phase: Determination of the limiting number of consecutive lines of bad pixels in the worst case of topology. It is noted, first of all, that the criteria of qualification of a sensor 2 are established as a function of the image chain 14 for which it is intended and also of the mode of operation of that chain. For example, a chain having rapid processors and a high number of parallel pixel processing paths may accept a poorer distribution of bad pixels than a less efficient chain. Likewise, an application which requires a high frame frequency will not be able to tolerate so great a number of bad pixels. This phase is aimed at determining what is, in the worst of cases, the hypothetical group of bad pixels in the sensor to be qualified beyond which there would be a malfunction of the image processing system 14 caused by the delay in output of images of the second block 20. Such a group of bad pixels will therefore be situated in the last lines of the image to be transmitted on output of the second block 20. On the other hand, the time of processing of each of those lines will be at a maximum when all the pixels assigned to any of the four parallel processing paths are bad. In fact, the number of bad pixels in the other paths then does not matter by reason of parallel processing, as explained above. In the example, this worst case of grouping thus occurs when the d consecutive last lines each contain a line quadrant saturated with bad pixels, that is, 256 bad pixels. Those lines saturated with bad pixels on a quadrant will be designated as "bad lines." The minimum number of bad pixels involved in such a group is therefore equal to d×256. The number of lines d is determined experimentally by measuring the delay Ri occasioned by the processing of bad pixels for different values of d. The delay Ri is measured here in terms of the interval Tes in the second block 20 separating the end signal eoi of the image i delayed by that processing and the appearance of the following image i+1 having to be processed. The greater the delay Ri, the shorter the remaining time Tes. A minimum threshold STmin is set in advance for time Tes. The threshold is established as a function of the operating characteristics of the image chain. In the example, that threshold is set at STmin=690 μs for a dynamic imaging application at 30 images per second. One then simulates on groups of bad pixels corresponding to the worst case of different numbers of successive lines d of bad pixels MP. Several methods can be envisaged for that simulation. In the example, a cartography of bad pixels corresponding to the topology of the group of bad pixels to be evaluated is loaded in the image processing system 14. The processing block 20 will thereby make an interpolation calculation on those pixels as if bad pixels really emanating from the sensor were involved. The numerical values of the set of pixels can be introduced in the second block 20 from an image memory so as to simulate the real output of the sensor 2.

Table 1 gives an example of results obtained by that simulation.

TABLE 1

Course of Tes in the second block for different numbers d of bad lines

| d | No. bad pixels | Tes (μs) | Within limit? |
|---|---|---|---|
| 8 | 2048 | 816 | Yes |
| 10 | 2560 | 700 | Yes |
| 11 | 2816 | 644 | No |

Figure 5:
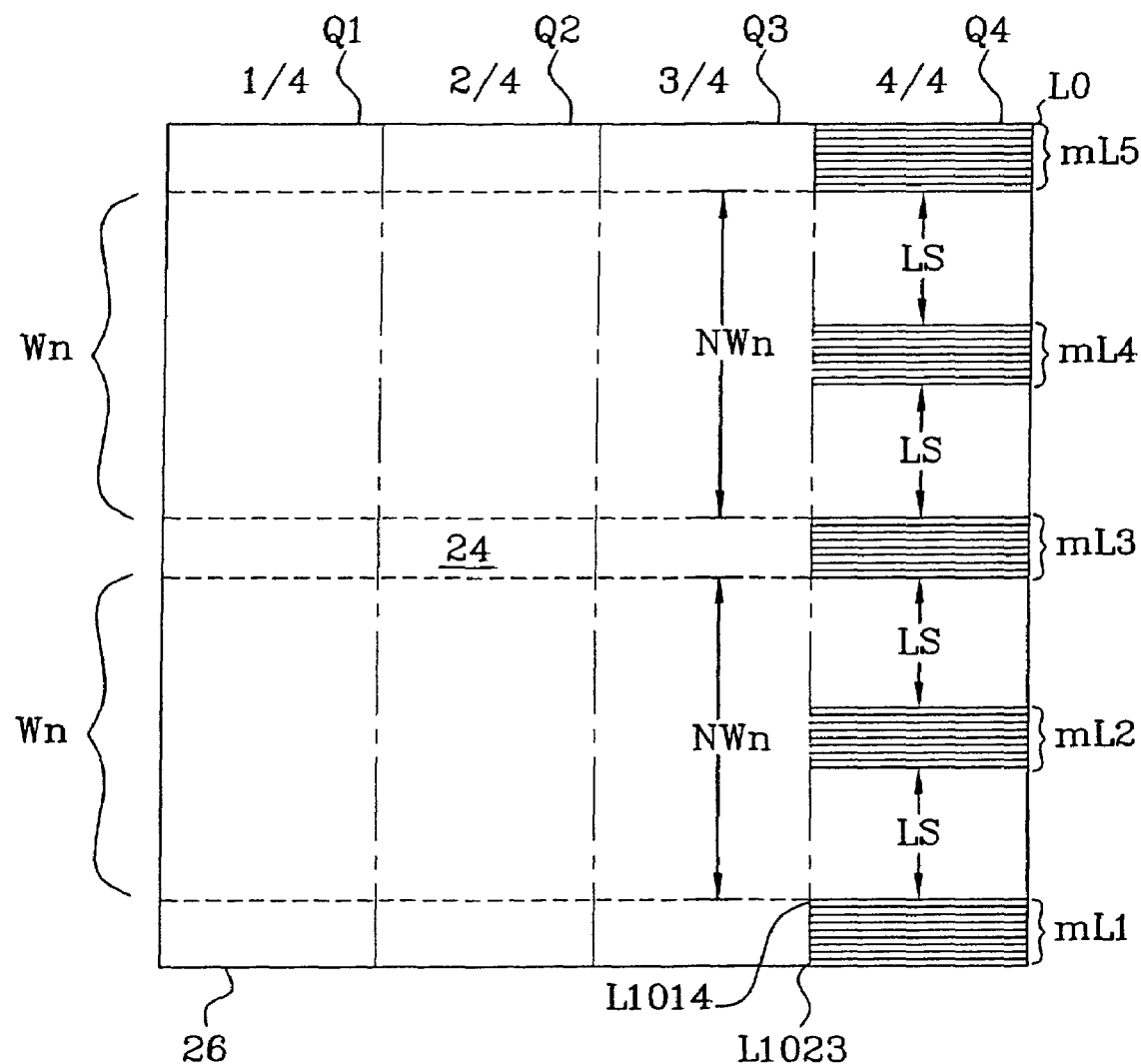
FIG. 5 schematically represents a cartography of bad pixels used for purposes of simulation in the method according to the invention.

These measurements indicate here that, in the worst case, there cannot be more than d=10 consecutive lines saturating at least one path of parallel processing of bad pixels. That group of 10 lines will be described as the "worst batch of bad lines" or more simply "worst batch" mL (FIG. 5). Furthermore, the minimum number of pixels, designated limMP, which must be involved in that case, is taken, that is, limMP=10×256=2560.

Second phase: Determination of the minimum admissible interval between two worst bundles of bad lines mL. The previous phase was confined to analyzing the most extreme case of bad pixel grouping, namely, that occurring at the end of processing. However, if such a worst batch of bad lines mL does not appear at the end of processing, it is possible in some cases to absorb the delay occasioned by its processing if: on the one hand, that batch is followed by a sufficient number LS of lines before another such batch or the end of the image, and on the other, those lines LS do not themselves occasion too long a time of processing of their possible bad pixels. In other words, the lines LS of an image following a worst batch can offer a catch-up time to the processing block of bad pixels 20. The second phase then comprises of determining the minimum number LS of lines which must separate two worst batches. For that purpose, a simulation is made by loading in the second processing block of bad pixels 20 new and different cartographies of bad pixels.

FIG. 5 is a graphic representation of a cartography 24 used for the second phase. The image format is contained in a frame 26 divided into four quadrants Q1 to Q4 in the direction of the columns, each quadrant containing a quarter-line assigned to a respective parallel processing path. The parts of the image containing bad pixels are represented by solid lines on the corresponding topographic site of the frame 26. It can therefore be seen that the cartography 24 contains the bad batches mL1–mL5 following each other at an interval expressed in terms of number LS of lines of separation. It is noteworthy that a bad batch mL occupies the last read lines of the image, that is, the 10 bottom lines L1014 to L1023 in the example considered. The interval LS corresponds to the number of lines between the last line of a bad batch mLi and the first line of the following bad batch mLi+1.

In the example, the bad pixels are grouped on a line quadrant, in this case, Q4 of the line-end pixels. All 256 columns of each line of a bad batch of that quadrant are occupied by the bad pixels. Outside of the bad pixels mL1–mL5, all the pixels are considered good.

In the simulations of that second phase, the processing time of the second block 20 of correction of the bad pixels is measured with different values for the interval of lines LS between the bad batches mL1–mL5. On each measurement, the delay Ri occasioned by processing of the bad batches mL1–mL5 of the entire image is determined. As in the first phase, that delay is analyzed in terms of the time Tes between output of the image after processing and arrival of the following image for processing. The maximum acceptable delay threshold taken for such cartography 24 is the same as for the first phase, namely, Tes=690 μs. Thus, any cartography rendering a time Tes less than that value is unacceptable.

Table II gives an example of measurements of time Tes for cartographies of bad pixels having different values of LS according to the diagram of FIG. 5. The table also indicates the total number of bad pixels MP contained in the cartographies.

TABLE II

Course of Tes in the second block for different values of LS

| LS | total MP in image | Tes (μs) | Within limit? |
|---|---|---|---|
| 210 | 12 800 | 696 | Yes |
| 194 | 15 104 | 696 | Yes |
| 182 | 15 360 | 620 | No |

One then finds from these values that the least proximity before exceeding the minimum authorized threshold of 690 μs for Tes is LS=194 lines.

In a variant, these measurements can be made by modifying the cartography of FIG. 5 so that only the two bad batches mL1 and mL2 at the bottom of the image are present. The number of bad pixels MP to be processed is then equal to 2×256=512 for the example considered. The value for Tes thus obtained with that simplified approach is very close to those of Table II for equal values of LS. However, the cartography of FIG. 5 offers more precision, for it takes into account the fact that the local delay for processing of a bad batch is not always completely absorbed in the interval of lines LS and that delays can thus be cumulated in the course of an image.

Third phase: Establishment of a measurement window

Following these first two phases, it was established, on the one hand, what was the maximum number of successive bad lines authorized in order to form a bad batch mL in the worst case of the figure and, on the other, what was the interval LS between these bad batches in the entire image. In the example, d=10 and LS=194.

From these values, a window Wn is established in the corresponding cartography 24 (FIG. 5), the number of lines NWn of which makes it possible to frame exactly: a bad batch mL, and the interval of LS lines preceding it. The number NWn of lines occupied by the window Wn is therefore given by the formula d+Ls. In the example, the window therefore occupies 10+194=204 lines. The width of the window Wn is equal to the length of a line. The window of the example therefore contains 1024×204=208,896 pixels, of which 2,560 are bad pixels according to the worst case from the topological point of view.

It is thus assured that the bad pixel processing block 20 is capable of absorbing in the worst case of the figure up to 2,560 bad pixels in that window, where it is located in the image. Beyond that limiting number of bad pixels in the window, their spatial distribution inside the window and the position of the window in the image must be taken into account, before being able to establish whether the bad pixel processing block could absorb them without exceeding the maximum authorized delay. By setting this limit of 2,560 bad pixels per window as a matter of course, calculated to take the worst case into account, a detailed examination of the bad pixels is avoided and the qualification procedure is therefore simplified.

Figure 6:
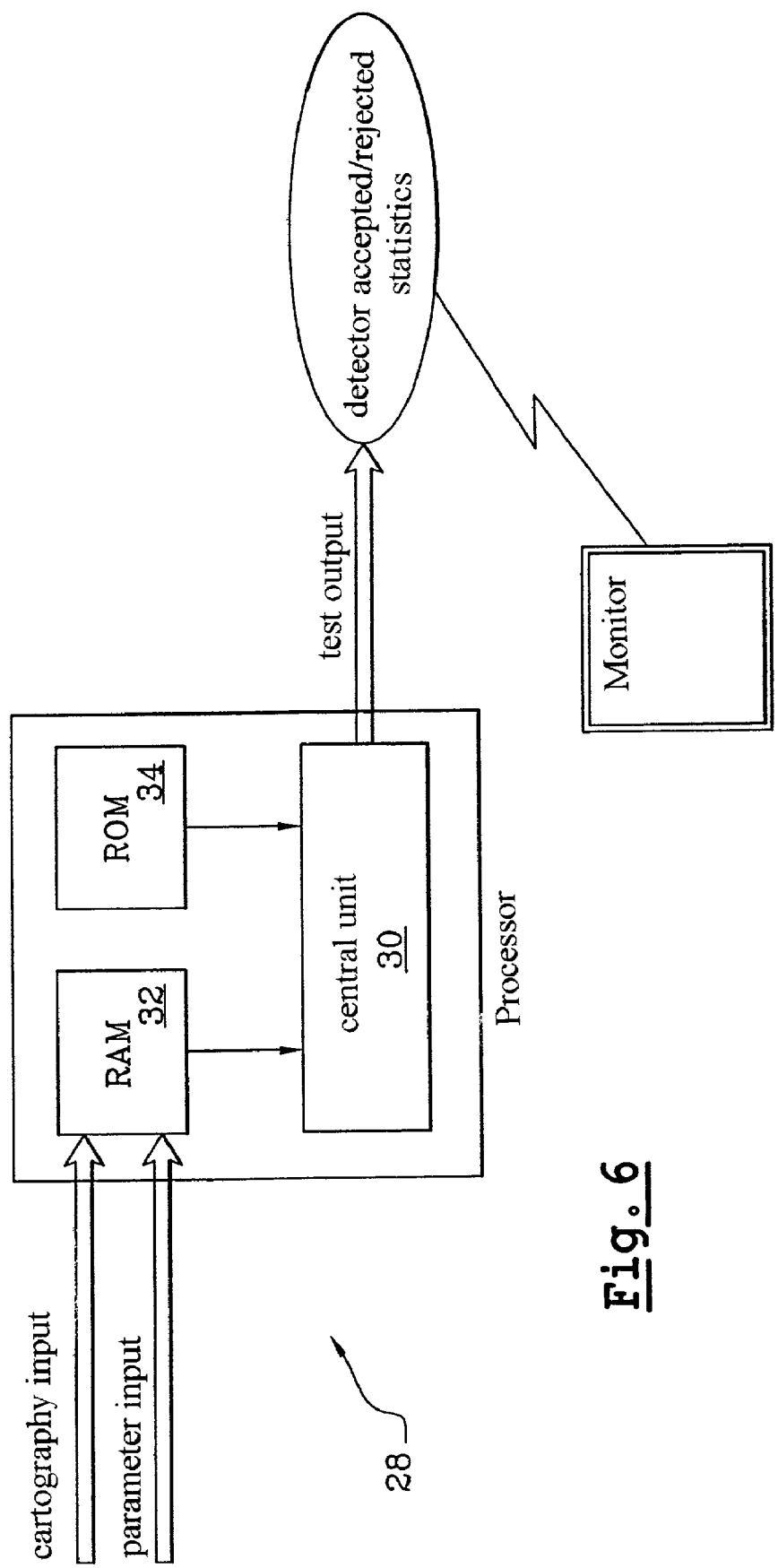
FIG. 6 is a simplified block diagram of a means for qualification of the sensor according to an embodiment of the invention.

Fourth phase: Qualification of a sensor by means of the window Wn. Up to now the measurements have been made on the basis of simulations of cartographies of bad pixels MP supplied by a hypothetical sensor having the output and image format characteristics of a real sensor 2. Those simulations made it possible to define the window Wn which will now be used for the qualification of real sensors, by referring to their cartography of bad pixels. The qualification which follows uses an algorithm automatically executed by a programmed means of calculation. That means of calculation can form integral part of the image processing apparatus 14 or be a separate apparatus, operating only on the manufacture and maintenance of sensors. FIG. 6 represents the principal blocks of the means of calculation 28. The latter comprises a central unit 30 based on a microprocessor system according to a standard architecture, a random access memory (RAM) 34 and a read only memory (ROM) 36. The read only memory contains the start-up program of the system ("boot") and the random access memory is loaded by a computer of "host PC" type. The data memorized comprise notably: the algorithm enabling the central unit 30 to make the qualification; the cartography of the bad pixels of the sensor in the course of qualification—that cartography can be presented as a list of bad pixels, designated by their coordinates P (m,n); and the parameters used in the algorithm, including: the number of lines NWn in the window Wn, the maximum number of bad pixels admissible in that window, the format of the image in pixels, and the columns of pixels assigned to the different parallel processing paths provided for processing. In the example, the latter parameter specifies that each line is divided into four equal quadrants Q1–Q4. The results of the qualification appear on a monitor 36. It is essentially a question of a dichotomic datum of yes/no type, depending on whether the detector is qualified or not. The indication can be associated with other data, for example, to indicate the window position having resulted in rejection, the total number of bad pixels, etc., in order to have useful statistics available for quality control. In the analysis of the bad pixels MP of a window Wn, only those which lie in the quadrant where they are most numerous for a given line are taken into account. The sum Tot.max. of those bad pixels on all of the lines of the window is then calculated. If that sum exceeds the limit limMP of 2,560 bad pixels for any part of the cartography where that window can be placed, the sensor evaluated (through its cartography) is rejected.

In mathematical terms, the Tot. max. value is expressed by the following formula:

$$\text{Tot.max.} = \sum_m \max[Q1(j), Q2(j), Q3(j), Q4(j)] \text{ for } j=n \text{ to } m,$$

where:

n is the number of the first line of pixels of the window Wn, m is the number of the last line of pixels of the window Wn, $Q1(j)$ is the number of bad pixels in the quadrant i (for i=1 to 4), and $\max[Q1(j), Q2(j), Q3(j), Q4(j)]$ is a function which selects the highest value Q among Q1 to Q4.

To analyze all of the cartography of the pixels, the window Wn is displaced line by line, starting with the top of the cartography, that is, with the first line of the window corresponding to the first line of pixels of the image delivered by the sensor. The calculation of the Tot.Max. value and its comparison with the limit limMP of 2,560 bad pixels are then repeated on each downward line displacement. The analysis is ended when the window reaches the bottom of the card, that is, when the last line of the window is at the last line of pixels of the image.

Figure 7:
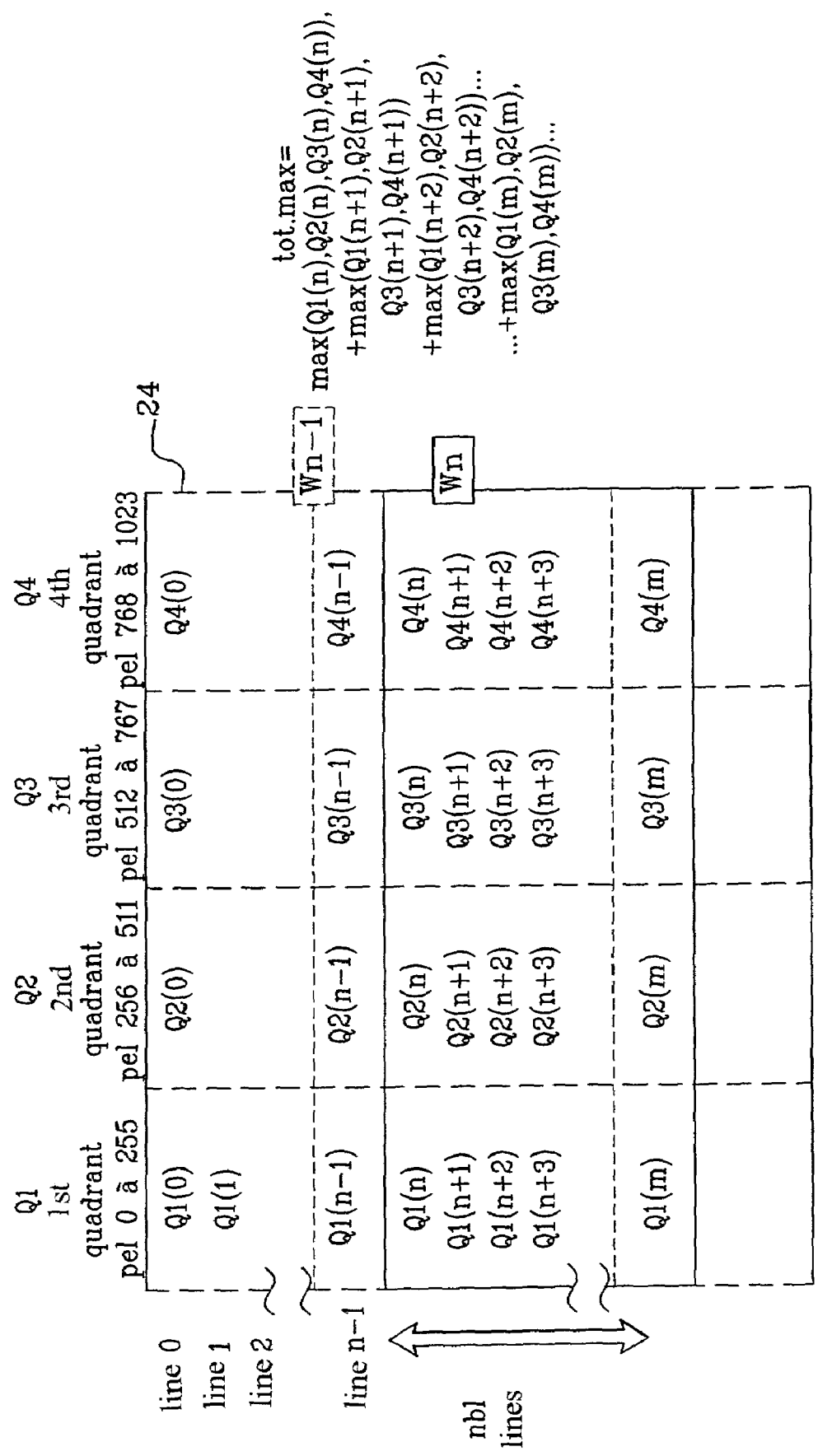
FIG. 7 symbolically represents the course of a window of evaluation of bad pixels on a cartography of a sensor when the latter transmits the image lines in their sequence on the image plane.

FIG. 7 graphically illustrates this process of calculation of Tot.max. on a sliding window Wn. In that figure, the window Wn in the course of calculation is represented by solid lines. The formula giving the Tot.max. value for that window is given to the right of the figure. The preceding position of the window (designated Wn−1) is represented by dotted lines.

Figure 8:
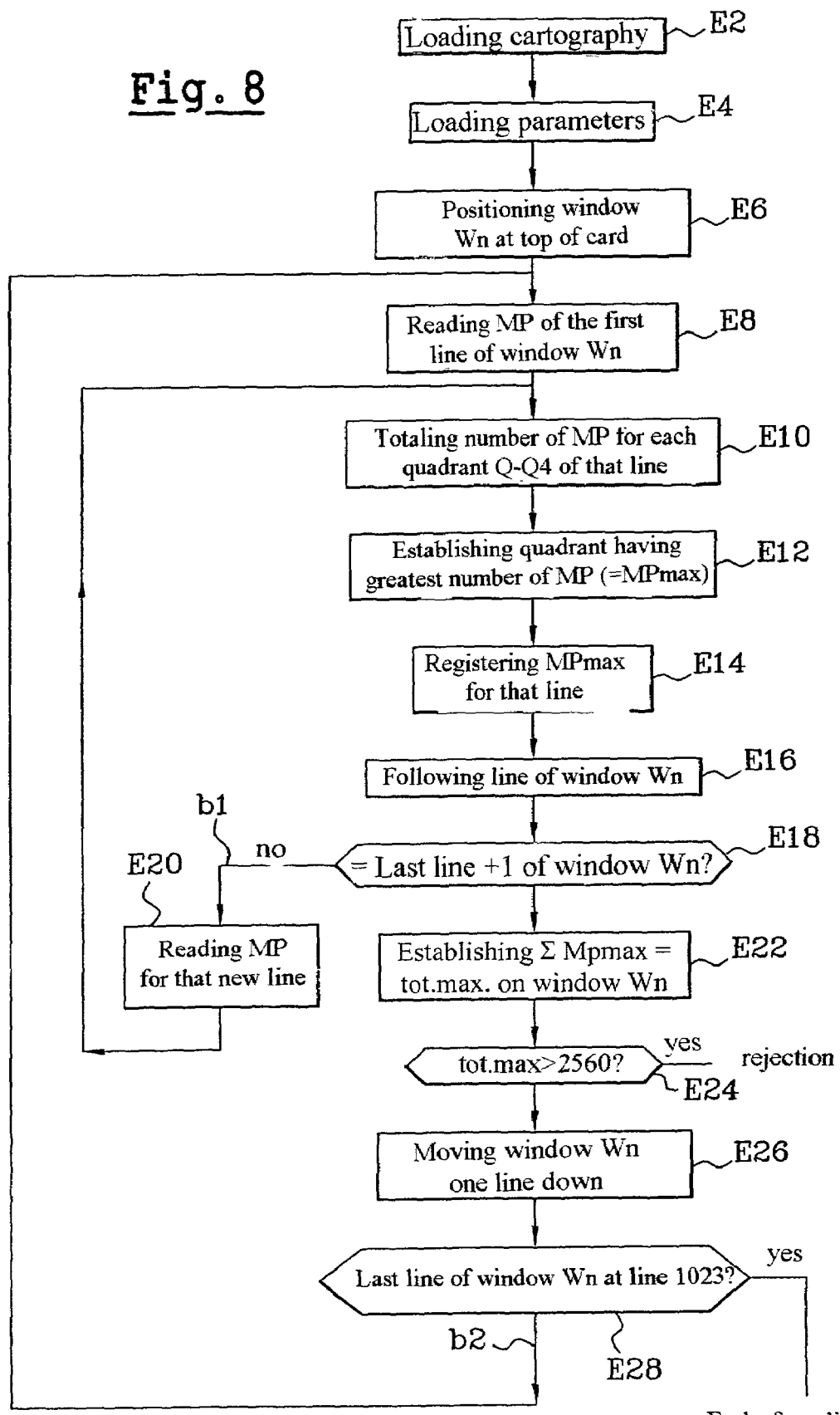
FIG. 8 is a flow chart explaining the principal stages carried out by the means for qualification of FIG. 6 on qualification of a detector.

FIG. 8 is a flow chart representing the main phases occurring in the qualification of a sensor by the calculation means 28. One begins by loading in the RAM memory 32 the cartography of the bad pixels for the sensor to be qualified (stage E2) and the aforementioned parameters used in the algorithm (stage E4). The central unit 30 then positions the window Wn at the top of the cartography of pixels 24 (FIG. 7). That operation consists essentially of loading in a register the lines of pixels of the window, respecting their local cartography inside that window (stage E6). The sequence of lines forming a window must correspond to the sequence of lines in the order in which they come out of the detector. The bad pixels MP of the first line L0 of the window are read (stage E8) and the number of bad pixels is totaled on each of the four quadrants Q1 to Q4 (stage E10). Four subtotals of bad pixels are then obtained, one per quadrant Q1–Q4. The central unit 30 then selects the highest subtotal of bad pixels, that subtotal being designated MPmax (stage E12). It involves carrying out the mathematical operation max[Q1(j), Q2(j), Q3(j), Q4(j)], where j corresponds here to line 0. The MPmax value is then entered in a register, which makes it possible to accumulate MPmax values for the successive lines of the window Wn (stage E14). The central unit 30 continues the aforesaid operations for the next line L1 of the window Wn (stage E16). However, before proceeding with those operations, it is verified that this next line does not go beyond the last line of the window (stage E18). That stage makes it possible to pass to the following window when the last line of a window has been processed. It consists in the example of establishing that if the number of the next line +1 goes beyond the lower limit of the window, that line is actually the last. The looping b1 following stage E18 thus makes it possible to obtain and register the Mpmax values in succession for all the lines of the window, by repeating stages E10 to E18. It is noted that the looping b1 includes a stage E20 of loading the next line, which is substituted for stage E8 of loading of the first line. When all of the lines of the window Wn have been processed, stage 18 of detection of the last line processed switches the process to the stage of establishment of the sum of all these MPmax values thus obtained for each of the lines (stage E22). That sum constitutes the aforesaid Tot.max. value for the window Wn, designated Tot.max.n. Then the central unit 30 determines whether that value does not exceed the threshold limMP of bad pixels admissible for a given window, i.e., 2,560 in the example. If one has Tot.max.n>2,560, the sensor having the cartography 24 analyzed is rejected (stage E24). Otherwise, the process is repeated for the following window, which corresponds to the preceding window slid one line downward. The process is thus repeated for all of the successive windows Wn to be analyzed, each new window corresponding to a shift of one line from the previous window (stage E26). It is noted that, according to this invention, the process of qualification does not take into account the topology of the bad pixels on the lines considered inside a window, which simplifies the means to be employed. The qualification ends, if not interrupted by a rejection in the aforementioned stage E24, when the window is displaced line by line to the position where its last line coincides with the last line L1023 of the cartography 24 (stage E28). Until that position is reached, the process is repeated from stage E8 for each new window Wn (looping b2).

The process thus makes it possible to scan the whole cartography 24 of a sensor in the course of qualification and to detect whether it is possible to place a window Wn anywhere, so that the Tot.max. number exceeds 2,560, and to reject the sensor in such case.

It is noted that the calculation can be greatly simplified in practice by taking into account the fact that the Tot.max. number varies between two windows which follow each other by the difference between the MPmax number for the last line of the new window and the MPmax number for the first line of the previous window, the other values of MPmax used for calculating Tot.max. being the same.

In practice, the bad pixels MP of a sensor will only rarely be distributed in order to constitute the worst case (concentrated in a same quadrant for a given line and on the last lines to be read). Hence, a sensor which is not rejected by the process of selection according to this invention will have a high probability of being able to allow a processing of the bad pixels, even if new bad pixels appear upon its use. The criteria elaborated upon the aforesaid phases 1 to 3 therefore create a margin of safety.

It is possible to increase that margin, for example, in order to secure greater spacing between two qualifications of a same sensor, by adding an extra phase after the third phase, which consists of reducing the total number of admissible bad pixels LimMP for a window. This reduction can be expressed by a percentage. For example, one can envisage reducing by 10% the number LimMP of 2,560 bad pixels obtained following a third phase, bringing the maximum threshold down to 2304.

An extra margin can also be created by increasing the number of lines NWn occupied by the window by a fixed number or by a percentage. For example, the number of lines can be increased by approximately 10%, which would give a window of 220 lines instead of 204 lines in the present case.

In practice, it turns out that the criteria applied and the process of qualification give rise to a relatively low rate of rejection for the sensors manufactured, while ensuring a good lifetime in the course of use.

The example given is based on a unique pixel output sensor, which supplies the successive lines to the image processing system 14 from top to bottom of the image, with the pixels of each line placed in order P(m,0) to P(m,1023).

In the case of the sensor of FIG. 1, however, it is necessary to take into account the fact that four reading circuits are used in parallel.

Figure 9:
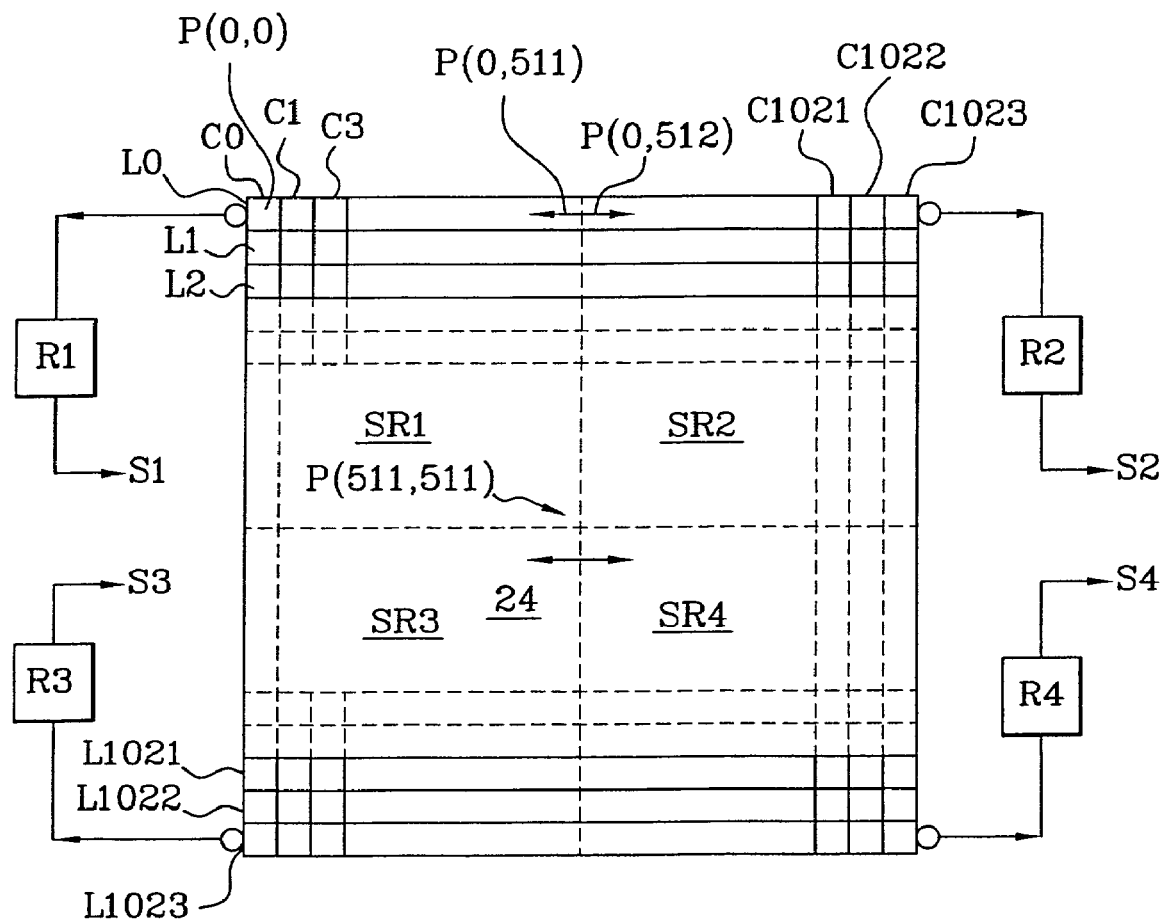
FIG. 9 is a topographic representation of the pixels corresponding to the sensitive elements of a sensor having four pixel reading circuits working in parallel.

FIG. 9 schematically represents cutting of the image plane of the cartography 24 of the pixels into four sectors SR1–SR4 of a quarter-image, each read by a respective reading circuit R1–R4. Each reading circuit takes the pixels from a corner of the image 26 by sequentially reading each half-line of its sector from the line of the upper edge (detector R1 or R2) or lower edge (detector R3 or R4), the last half-line read being that of the center of the image. For example, the reading circuit Ri first reads the half-line of pixel P(0,0) to P(0,511) and ends the reading with pixel P(511,511). The outputs S1–S4 of the reading circuits feed the image processing system 14 in parallel. That implies that the second bad pixel processing block 20 first receives for each image the first line and the last line, respectively supplied by the reading circuits SR1, SR2 and SR3, SR4, and at image end the middle lines L511 and L512. Outputs S1 and S2, on the one hand, and S3 and S4, on the other, are reconfigured upstream to make sure that the pixels of each line supplied follow each other in the order of their position in the image. As a result, the critical lines, that is, the last ones to be read (and, therefore, to be processed) are then situated in the middle of the image. That difference does not affect the basis of elaboration of the aforesaid phases 1 to 4.

As far as qualification of the sensor 2 is concerned, the cartography is adjusted so that it presents the lines from top to bottom in their order of appearance on processing input of the bad pixels.

Figure 10:
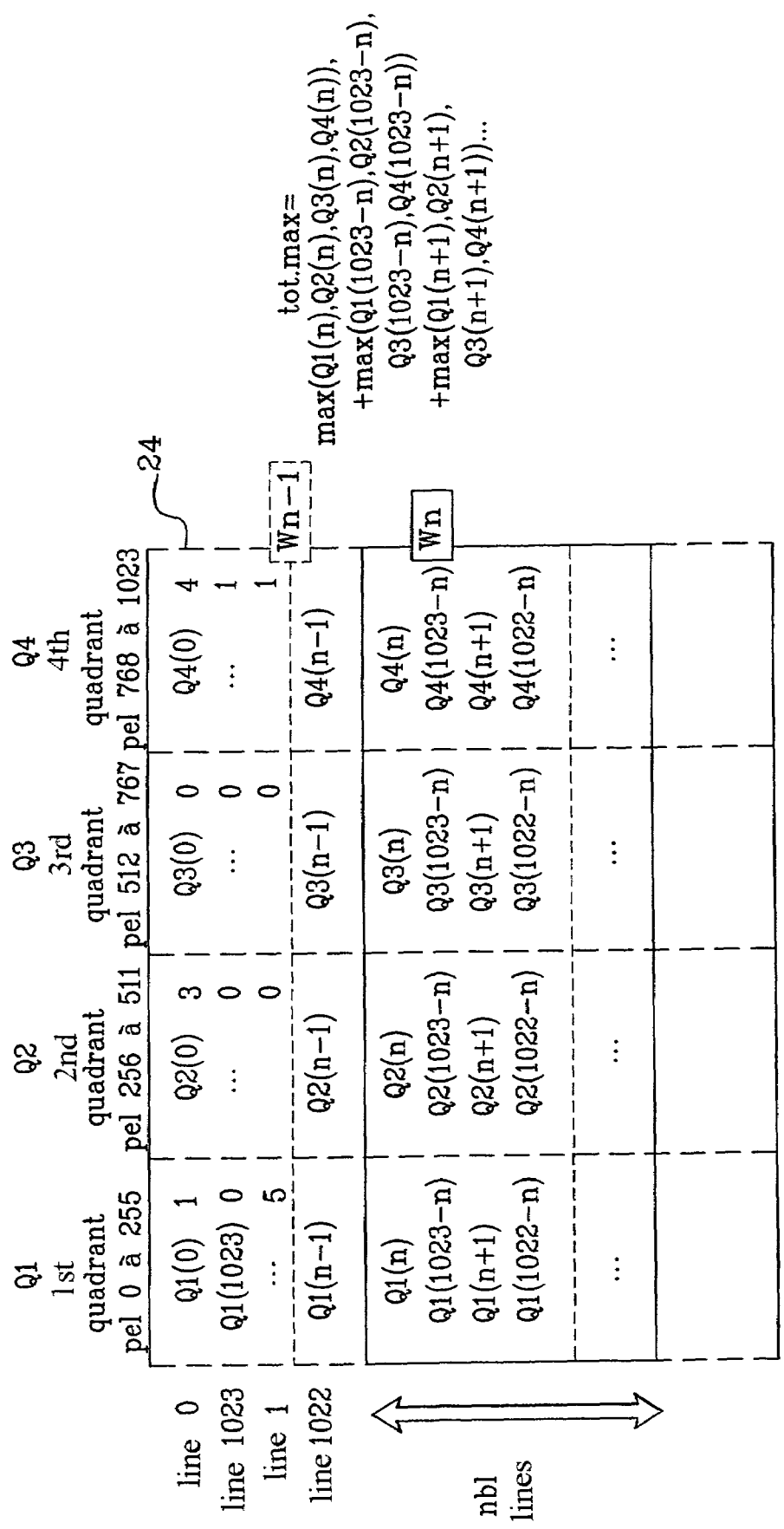
FIG. 10 symbolically represents the course of a window of evaluation of bad pixels on a cartography of a sensor, when the latter transmits the image lines alternately from the first and from the last line of the image remaining to be read.

FIG. 10 is a representation of the cartography 24 analogous to that of FIG. 7, adapted for the sensor according to FIG. 9. One finds that the window Wn then consists of a sequence of lines coming alternately on both sides from the lower and upper edges of the image remaining to be read. Thus, for a window Wn, the first line of which is line n, the order of lines counted is: Ln, L(1023−n), L(n+1), L(1022−n), etc. The calculation of total number Tot.max. of bad pixels MP to be counted in the window Wn is identical to the preceding case. It is noted, in fact, that the lines of the cartography 24 in FIG. 10 are also divided into four quadrants Q1–Q4 corresponding to respective parallel processing paths.

Likewise, the possibilities of providing for extra margins by a reduction of the limit tolerated for LimMp and/or by increase of the number NWn of lines of the window also apply in this case.

A variant calculation of the Tot.max. number for a given window Wn will now be described, making possible a simplification of the procedure. According to that variant, the set of bad pixels MP to be counted in a given window is simply the number of bad pixels present in that window. In other words, one does not select for each line only the quadrant presenting the greatest number of bad pixels. Expressed mathematically, the set of bad pixels to be counted for a window Wn is Tot.max.=ΣMP(Li) for i=m to n, where m and n are respectively the first and the last line of the window Wn. If necessary, the limit LimMP tolerated for Tot.max. can be modified, considering that this method of calculation will have to render the Tot.max. values higher than in the method previously described. This variant is applicable to all the cartographies, notably, to those of FIGS. 7 and 10.

Figure 11:
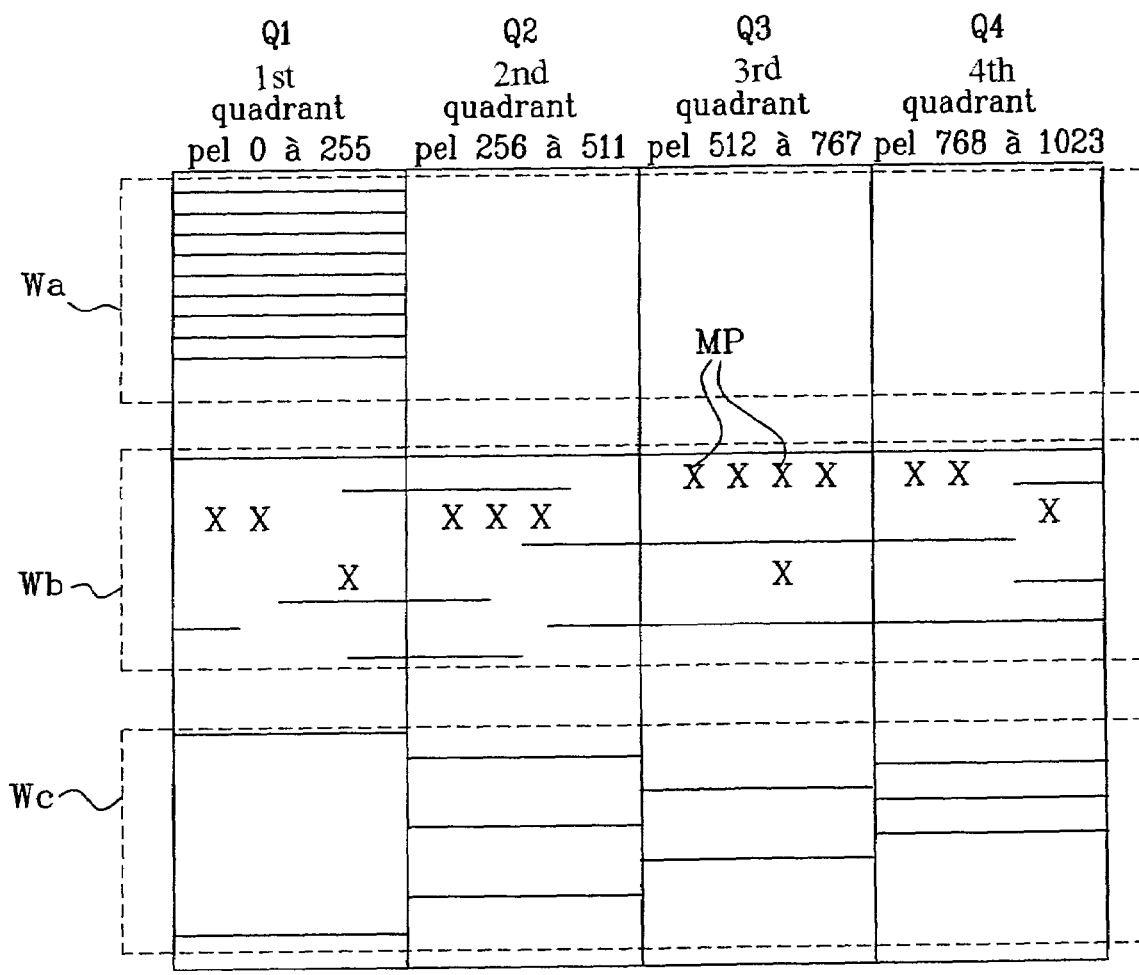
FIG. 11 symbolically represents a cartography showing three cases of a figure of distribution of bad pixels in respective windows.

FIG. 11 gives three examples of distribution of bad pixels MP on respective windows Wa, Wc [sic] and Wc delimited by dotted lines. The distribution of bad pixels in window Wa is bad, in the sense that the latter are grouped in 10 lines of 256 consecutive pixels on a same quadrant Q1. That distribution actually corresponds to the worst case according to the example described, which sets the upper limit of 10×256 bad pixels allowed for a window. The distribution of bad pixels in window Wc is equally bad, also involving 10 groups of 256 consecutive bad pixels. It differs from that of window Wa in that the groups are not all in the same quadrant. However, it is observed that there is never more than one group of bad pixels per line, which rules out the possibility of a parallel processing of a part of the latter. The processing time is thereby roughly the same as for window Wa. The distribution of bad pixels in window Wb is better, for it is found to be distributed over several quadrants Q1–Q4 of a same line. Those pixels may then be processed in parallel in the respective processing paths, the maximum time of processing being equal to the processing time for the quadrant containing the greatest number of bad pixels. The window covers approximately 13×256 pixels, that is, more than the limit set for rejection, but can, nevertheless, accept even more bad pixels without impairing processing efficiency. What is therefore involved is a window which would have caused rejection of the sensor, not by reason of an immediate malfunction of the latter in processing of the bad pixels, but because it does not offer a wide enough margin to accommodate possible new bad pixels during use, according to the criteria adopted. It can be observed from the foregoing that if the bad pixels are poorly distributed in the four quadrants Q1–Q4, the processing capacity will be only 2,560×1023/204=12,837 bad pixels per sensor 2, or 2,300× 1023/220=10,695 bad pixels, by adding the aforesaid margins, on the basis of the figures of the example.

The method according to the embodiment of the invention offers a judicious and effective compromise between the complexity of qualification of a sensor and reliability in estimation of the capacity to absorb the load for the correction of bad pixels. It is noted, in particular, that the method: does not impose any restraint on lessening bad lines or masses of bad pixels, the only restraint being that there must not be more than a given number of lines saturated with bad pixels in order to meet the specification of the sensor; makes it possible to allow a margin in the density of bad pixels, in order to avoid rejection of the sensor, if some bad pixels appear in the course of use; and is relatively easy to use and does not require complex means of calculation or parameters.

It is to be understood that the principles of the invention apply to all sorts of sensors which deliver pixels on output, whatever their image format, range of spectral sensitivity or dimensions. Just by way of indication, the invention can be used for radiological, infrared or optical image sensors (for example, sensors of CCD (charge-coupled device) type, those sensors having sensitive elements in matrix or linear form (for operation by procession).

Furthermore, the values given for different parameters are not at all limitative, experts being able to select the values which suit them according to the application sought, in light of the information given. For example, the method lends itself to all image formats and to any system of processing of bad pixels. In this embodiment, four parallel processing paths are used, involving cutting of the lines into four quadrants.

This idea may, of course, be generalized for a system having a number s of parallel processing paths (where s is an integer equal to or greater than 1), in which case the lines will be cut into s sections, each assigned to a respective processing path. In that case, the section having the greatest number of bad pixels will be taken into account in order to estimate the Tot.max. value.

For a nonparallel processing (s=1), all of the bad pixels of a line will be counted.

Various modifications in structure and/or steps and/or function may be made by one skilled in the art without departing from the scope and extent of the invention as recited in the claims.

What is claimed is:

1. A method of qualification of an image sensor having images in the form of pixels, comprising the steps of:
   determining the maximum limit of the number of bad pixels in a given area of the image that can be processed;
   defining a sliding window having the format of the area determined, the sliding window configured to occupy a number of image sensor lines less than the total number of image sensor lines;
   establishing a cartography of the pixels forming an image delivered byte sensor which indicates the locations of bad pixels;
   controlling whether a part of the cartography that may contain the window has a set of bad pixels incompatible with the maximum limit; and
   qualifying or rejecting the sensor depending on the controlling step;
   wherein the sliding window slides from a first position to a second position such that the second position frames the same number of lines as the first position, the number of lines being greater than one, and the second position frames all but one of the lines from the first position.

2. The method according to claim 1, wherein the controlling step comprises moving the window line by line over the entire cartography and, for each position of the window, making a calculation from the number of bad pixels present in the window.

3. The method according to claim 1 where the processing of bad pixels is intended to be carried out in parallel, each line of pixels on output of the sensor being divided into a number of sections, the pixels of each section being assigned to a respective parallel processing path, and the set of bad pixels counted in a window on the controlling step comprises, for each line of the window, solely of bad pixels to be found in a section, among the line sections, where they are most numerous.

4. The method according to claim 2 where the processing of bad pixels is intended to be carried out in parallel, each line of pixels on output of the sensor being divided into a number of sections, the pixels of each section being assigned to a respective parallel processing path, and the set of bad pixels counted in a window on the controlling step comprises, for each line of the window, solely of bad pixels to be found in a section, among the line sections, where they are most numerous.

5. The method according to claim 3, wherein the set of bad pixels counted comprises the sum of the most numerous pixels in a line section on each of the lines of the window, which sum must not exceed the maximum limit.

6. The method according to claim 4, wherein the set of bad pixels counted comprises the sum of the most numerous pixels in a line section on each of the lines of the window, which sum must not exceed the maximum limit.

7. The method according to claim 3, wherein the number of line sections is equal to four, the bad pixels being processed in parallel on four.

8. The method according to claim 4, wherein the number of line sections is equal to four, the bad pixels being processed in parallel on four.

9. The method according to claim 1, wherein the set of bad pixels counted on the controlling step consists of the sum of the bad pixels in the window.

10. The method according to claim 2, wherein the set of bad pixels counted on the controlling step consists of the sum of the bad pixels in the window.

11. The method according to claim 1, wherein a sensor is rejected if there should be only one location of the window on its cartography for which the set of bad pixels is incompatible with the maximum limit.

12. The method according to claim 1, wherein the maximum limit is calculated on the basis of the number of lines of bad pixels in a batch of bad lines comprising a given number of successive lines, each containing a number of bad pixels likely to create a maximum processing time for that line on the means of processing bad pixels or on one of the parallel processing pats of those means.

13. The method according to claim 12, wherein the given number of bad lines is the limiting number of lines beyond which the lime of processing the bad pixels for the entire batch of bad lines would occasion an inadmissible delay in output of the image after processing.

14. The method according to claim 12, wherein the batch of bad lines comprises the last lines to be processed.

15. The method according to claim 13, wherein the batch of bad lines comprises the last lines to be processed.

16. The method according to claim 12, wherein the size of the given area and therefore of the window is calculated on the basis of a maximum frequency of appearance of a batch of bad lines in a hypothetical cartography, beyond which the time of processing of the bad pixels for the set would occasion an inadmissible delay in output of the image after processing.

17. The method according to claim 13, wherein the size of the given area and therefore of the window is calculated ante basis of a maximum frequency of appearance of a batch of bad lines in a hypothetical cartography, beyond which the time of processing of the bad pixels for the set would occasion an inadmissible delay in output of the image after processing.

18. The method according to claim 14, wherein the size of the given area and therefore of the window is calculated on the basis of a maximum frequency of appearance of a batch of bad lines in a hypothetical cartography, beyond which the time of processing of the bad pixels for the set would occasion an inadmissible delay in output of the image after processing.

19. The method according to claim 15, wherein the size of the given area and therefore of the window is calculated on the basis of a maximum frequency of appearance of a batch of bad lines in a hypothetical cartography, beyond which the time of processing of the bad pixels for the set would occasion an inadmissible delay in output of the image after processing.

20. The method according to claim 16, wherein the size of the window depends on the number of bad lines in a batch of bad lines and on the number of lines separating two successive batches of bad lines in the hypothetical cartography.

21. The method according to claim 12, wherein the size of the window depends on the number of bad lines in a batch of bad lines and on the number of lines separating two successive batches of bad lines in the hypothetical cartography.

22. The method according to claim 13, wherein the size of the window depends on the number of bad lines in a batch of bad lines and on the number of lines separating two successive batches of bad lines in the hypothetical cartography.

23. The method according to claim 14, wherein the size of the window depends on the number of bad lines in a batch of bad lines and on the number of lines separating two successive batches of bad lines in the hypothetical cartography.

24. The method according to claim 15, wherein the size of the window depends on the number of bad lines in a batch of bad lines and on the number of lines separating two successive batches of bad lines in the hypothetical cartography.

25. The method according to claim 20, wherein the size of the window expressed in lines of pixels, is equal at least to the number of bad lines in a batch of bad lines plus the number of lines separating two successive batches of bad lines in the hypothetical cartography.

26. The method according to claim 12, wherein the size of the window expressed in lines of pixels, is equal at least to the number of bad lines in a batch of bad lines plus the number of lines separating two successive batches of bad lines in the hypothetical cartography.

27. The method according to claim 13, wherein the size of the window expressed in lines of pixels, is equal at least to the number of bad lines in a batch of bad lines plus the number of lines separating two successive batches of bad lines in the hypothetical cartography.

28. The method according to claim 14, wherein the size of the window expressed in lines of pixels, is equal at least to the number of bad lines in a batch of bad lines plus the number of lines separating two successive batches of bad lines in the hypothetical cartography.

29. The method according to claim 15, wherein the size of the window expressed in lines of pixels, is equal at least to the number of bad lines in a batch of bad lines plus the number of lines separating two successive batches of bad lines in the hypothetical cartography.

30. The method according to claim 16, wherein the size of the window expressed in lines of pixels, is equal at least to the number of bad lines in a batch of bad lines plus the number of lines separating two successive batches of bad lines in the hypothetical cartography.

31. The method according to claim 1, wherein the calculation of the maximum limit of number of bad pixels in a given area of the image that can be processed may include a first phase of establishment of a real limiting value and a second stage of obtaining a limiting value used for the controlling step, the limiting value used for the controlling step being obtained by reducing the real limiting value.

32. The method according to claim 1, wherein calculation of the size of the window includes a first phase of establishment of a size determined on the basis of a real limiting value in terms of number of lines and a second phase of obtaining a sire value used for to controlling step, the size value used for the controlling step being obtained by increasing the real limiting value.

33. The method according to claim 1, wherein the qualification is provided for a sensor delivering images in dynamic mode, the separation between two successive images being fixed, wherein the processing time needed in the step of determination of the maximum limit of number of bad pixels is determined on the basis of time remaining between the end of an image on output after processing of the bad pixels, and arrival of the following image for processing of the bad pixels.

34. The method according to claim 33, where the frequency of dynamic images is 30 images per second, maximum limit in number of bad pixels is determined so that the time remaining is greater than or equal to 690 microseconds.

35. The method according to claim 1, wherein the qualification of sensors is intended fir medical radiology.

36. The method of claim 1, wherein:
the first position encompasses a first set of lines, the second position encompasses a second set of lines, and the second set of lines overlaps the first set of lines.

37. The method of claim 1, further comprising:
determining a delay time occasioned by the processing of the bad pixels;
wherein the processing time depends on the distribution of the bad pixels; and
wherein the determining the maximum limit of the number of bad pixels in a given area is a function of the distribution of bad pixels in the sliding window that can be processed within the delay time.

38. The method of claim 1, further comprising:
setting a delay time limit on delivering a corrected image of bad pixels, the delay time limit occasioned by the processing of the bad pixels, the processing time depending on the distribution of the bad pixels;
wherein the determining the maximum limit of the number of bad pixels in a given area is a function of their spatial distribution within the sliding window and the position of the sliding window within the image;
wherein the determining the maximum limit of the number of bad pixels in a given area results in the delay time limit not exceeding a maximum delay time.

39. Apparatus for qualification of an image sensor having images in the form of pixels, comprising:
means for loading a cartography of pixels forming an image delivered by the sensor, which indicates the locations of the bad pixels;
means for loading qualification calculation parameters, defining a maximum limit in number of bad pixels in a given area of the image that can be processed;
means for processing of the bad pixels;
means for providing a sliding window having the format of the given area, the sliding window configured to occupy a number of image sensor lines less than the total number of image sensor lines;

means for calculation applying the calculation parameters on the cartography in order to determine whether a part of the cartography that may contain the window has a set at bad pixels incompatible with the maximum limit; and means for qualifying or rejecting the sensor depending on the means for calculation;

wherein the sliding window is configured to slide from a first position to a second position such that the second position frames the same number of lines as the first position, the number of lines being greater than one, and the second position frames all but one of the lines from the first position.

40. Apparatus according to claim 39, wherein the means for calculation includes means for moving the window line by line over the entire cartography and means for making a calculation from the number of bad pixels present in the window.

41. Apparatus according to claim 39, wherein the processing of bad pixels is intended to be carried out in parallel, each line of pixels on output of the sensor being divided into a number of sections, the pixels of each section being assigned to a respective parallel processing path, and the set of bad pixels counted in a window by the means for calculation comprises, for each line of the window, solely of bad pixels to be found in a section, among the line sections, where they are most numerous.

42. Apparatus according to claim 40, wherein the processing of bad pixels is intended to be carried out in parallel, each line of pixels on output of the sensor being divided into a number of sections, the pixels of each section being assigned to a respective parallel processing path, and the set of bad pixels counted in a window by the means for calculation comprises, for each line of the window, solely of bad pixels to be found in a section, among the line sections, where they are most numerous.

43. Apparatus according to claim 39, wherein the set of bad pixels counted consists of the sum of the most numerous pixels in a line section on each of the lines of the window, which sum must not exceed the maximum limit.

44. Apparatus according to claim 42, wherein the set of bad pixels counted consists of the sum of the most numerous pixels in a line section on each of the lines of the window, which sum must not exceed the maximum limit.

45. Apparatus according to claim 41, wherein the number of line sections is equal to four, the bad pixels being processed in parallel on four paths in the means for processing.

46. Apparatus according to claim 43, wherein the number of line sections is equal to four, the bad pixels being processed in parallel on four pats in the means for processing.

47. Apparatus according to claim 39, wherein the set of bad pixels counted comprises of the sum of the bad pixels in the window.

48. Apparatus according to claim 40, wherein the set of bad pixels counted comprises of the sum of the bad pixels in the window.

49. Apparatus according to claim 39, wherein a sensor is rejected if there should be at least one location of the window on its cartography for which the set of bad pixels (MP) is incompatible with the maximum limit.

50. Apparatus according to claim 39, wherein the maximum limit is calculated on the basis of the number of bad pixels in a batch of bad lines comprising a given number of successive line, each containing a number of bad pixels likely to create a maximum processing time for that line on the means for processing or on one of the parallel processing paths of the means for processing.

51. Apparatus according to claim 50, wherein the given number of bad lines determined is the limiting number of lines beyond which the time of processing the bad pixels for the entire batch of bad lines would occasion an inadmissible delay in output of the image after processing.

52. Apparatus according to claim 50, wherein the batch of bad lines comprises the last lines to be processed by the means for processing.

53. Apparatus according to claim 51, wherein the batch of bad lines comprises the last lines to be processed by the means for processing.

54. Apparatus according to claim 50, wherein the size of the given area and therefore of the window is calculated on the basis of a maximum frequency of appearance of a batch of bad lines in a hypothetical cartography, beyond which the time of processing of the bad pixels for the set would occasion an inadmissible delay in output of the image after processing.

55. Apparatus according to claim 51, wherein the size of the given area and therefore of the window is calculated on the basis of a maximum frequency of appearance of a batch of bad lines in a hypothetical cartography, beyond which the time of processing of the bad pixels for the set would occasion an inadmissible delay in output of the image after processing.

56. Apparatus according to claim 52, wherein the size of the given area and therefore of the window is calculated on the basis of a maximum frequency of appearance of a batch of bad lines in a hypothetical cartography, beyond which the time of processing of the bad pixels for the set would occasion an inadmissible delay in output of the image after processing.

57. Apparatus according to claim 53, wherein the size of the given area and therefore of the window is calculated on the basis of a maximum frequency of appearance of a batch of bad lines in a hypothetical cartography, beyond which the time of processing of the bad pixels forte set would occasion an inadmissible delay in output of the image after processing.

58. Apparatus according to claim 54, wherein the size of the window then depends on the number of bad lines in a batch of bad lines and on the number of lines separating two successive batches of bad lines in the hypothetical cartography.

59. Apparatus according to claim 55, wherein the size of the window then depends on the number of bad lines in a batch of bad lines and on the number of lines separating two successive batches of bad lines in the hypothetical cartography.

60. Apparatus according to claim 56, wherein the size of the window then depends on the number of bad lines in a batch of bad lines and on the number of lines separating two successive batches of bad lines in the hypothetical cartogrsphy.

61. Apparatus according to claim 57, wherein the size of the window then depends on the number of bad lines in a batch of bad lines and on the number of lines separating two successive batches of bad lines in the hypothetical cartography.

62. Apparatus according to claim 58, wherein the size of the window then depends on the number of bad lines in a batch of bad lines and on the number of lines separating two successive batches of bad lines in the hypothetical cartography.

63. Apparatus according to claim 59, wherein the size of the window then depends on the number of bad lines in a batch of bad lines and on the number of lines separating two successive batches of had lines in the hypothetical cartography.

64. Apparatus according to claim 58, wherein the size of the window, expressed in lines of pixels, is equal to the number of bad lines of the batch of bad lines plus the number of lines separating two successive batches of bad lines in the hypothetical cartography.

65. Apparatus according to claim 50, wherein the size of the window, expressed in lines of pixels, is equal to the number of bad lines of the batch of bad lines plus the number of lines separating two successive batches of bad lines in the hypothetical cartography.

66. Apparatus according to claim 51, wherein the size of the window, expressed in lines of pixels, is equal to the number cited lines of the batch of bad lines plus the number of lines separating two successive batches of bad lines in the hypothetical cartography.

67. Apparatus according to claim 52, wherein the size of the window, expressed in lines of pixels, is equal to the number of bad lines of the batch of bad lines plus the number of lines separating two successive batches of bad lines in the hypothetical cartography.

68. Apparatus according to claim 53, wherein the size of the window, expressed in lines of pixels, is equal to the number of bad lines of the batch of bad lines plus the number of lines separating two successive batches of bad lines in the hypothetical cartography.

69. Apparatus according to claim 54, wherein the size of the window, expressed in lines of pixels, is equal to the number of bad lines of the batch of bad lines plus the number of lines separating two successive batches of bad lines in the hypothetical cartography.

70. Apparatus according to claim 55, wherein the size of the window, expressed in lines of pixels, is equal to the number of bad lines of the batch of bad lines plus the number of lines separating two successive batches of bad lines in the hypothetical cartography.

71. Apparatus according to claim 39, wherein the calculation of the maximum limit of number of bad pixels in a given area of the image that can be processed includes a first phase of establishment of a real limiting value and a second stage of obtaining a limiting value used for the calculation, the limiting value used for the calculation being obtained by reducing the real limiting value.

72. Apparatus according to claim 39, wherein calculation of the size of the window includes a first phase of establishment of a size determined on the basis of a real limiting value in terms of number of lines and a second phase of obtaining a size value used for the calculation, the size value used for the calculation being obtained by increasing the real limiting value.

73. Apparatus according to claim 39, where qualification is provided for a sensor delivering images in dynamic mode having a fixed separation between two successive images wherein the processing time needed in the step of determination of the maximum limit of number of bad pixels is determined on the basis of time remaining between the end of an image on output after processing of the bad pixels and arrival of the following image for processing.

74. Apparatus according to claim 73, where the frequency of dynamic images is 30 images per second, and the maximum limit in number of bad pixels is determined so that the time remaining is greater than or equal to 690 microseconds.

75. Apparatus according to claim 39, wherein the qualification of sensors is intended for medical radiology.

\* \* \* \* \*